(12) United States Patent
Patchell

(10) Patent No.: US 7,548,156 B2
(45) Date of Patent: Jun. 16, 2009

(54) METHOD OF DISTINGUISHING, FROM A MOVING PLATFORM, STATIONARY OBJECTS FROM MOVING OBJECTS

(75) Inventor: John W. Patchell, Carleton Place (CA)

(73) Assignee: 1138037 Ontario Ltd., Ontario (CA)

( * ) Notice: Subject to any disclaimer, the term of this patent is extended or adjusted under 35 U.S.C. 154(b) by 222 days.

(21) Appl. No.: 11/478,939

(22) Filed: Jun. 30, 2006

(65) Prior Publication Data

US 2007/0016339 A1    Jan. 18, 2007

Related U.S. Application Data

(60) Provisional application No. 60/696,971, filed on Jul. 6, 2005.

(51) Int. Cl.
*B60Q 1/00* (2006.01)

(52) U.S. Cl. .............. 340/435; 340/436; 340/438; 340/903; 340/933

(58) Field of Classification Search .......... 340/435, 340/436, 437, 438, 439, 441, 903, 933, 942, 340/943; 701/1, 96, 300

See application file for complete search history.

(56) References Cited

U.S. PATENT DOCUMENTS

| 5,185,593 | A | * | 2/1993 | DuRand et al. ............. 340/544 |
| 5,339,075 | A |   | 8/1994 | Abst et al. |
| 5,642,194 | A | * | 6/1997 | Erskine ...................... 356/497 |
| 6,011,974 | A | * | 1/2000 | Cedervall et al. ........ 455/456.4 |
| 6,061,001 | A | * | 5/2000 | Sugimoto ................... 340/903 |
| 6,084,512 | A | * | 7/2000 | Elberty et al. ............ 340/572.1 |
| 6,753,766 | B2 |  | 6/2004 | Patchel |
| 6,924,736 | B2 | * | 8/2005 | Oexmann et al. ........... 340/436 |

FOREIGN PATENT DOCUMENTS

EP            0624857       11/1994

* cited by examiner

*Primary Examiner*—Anh V La
(74) *Attorney, Agent, or Firm*—Hoffmann & Baron, LLP

(57) ABSTRACT

A method of distinguishing, from a moving platform, stationary objects from moving objects. The method includes using a first detector mounted to the moving platform to obtain at least a first reading from a target area, advancing the moving platform relative to the target area and using a second detector mounted to said moving platform to obtain at least a second reading from said target area. Then, the method includes comparing said first and second readings for at least two different time intervals to distinguish moving objects from stationary objects.

7 Claims, 10 Drawing Sheets

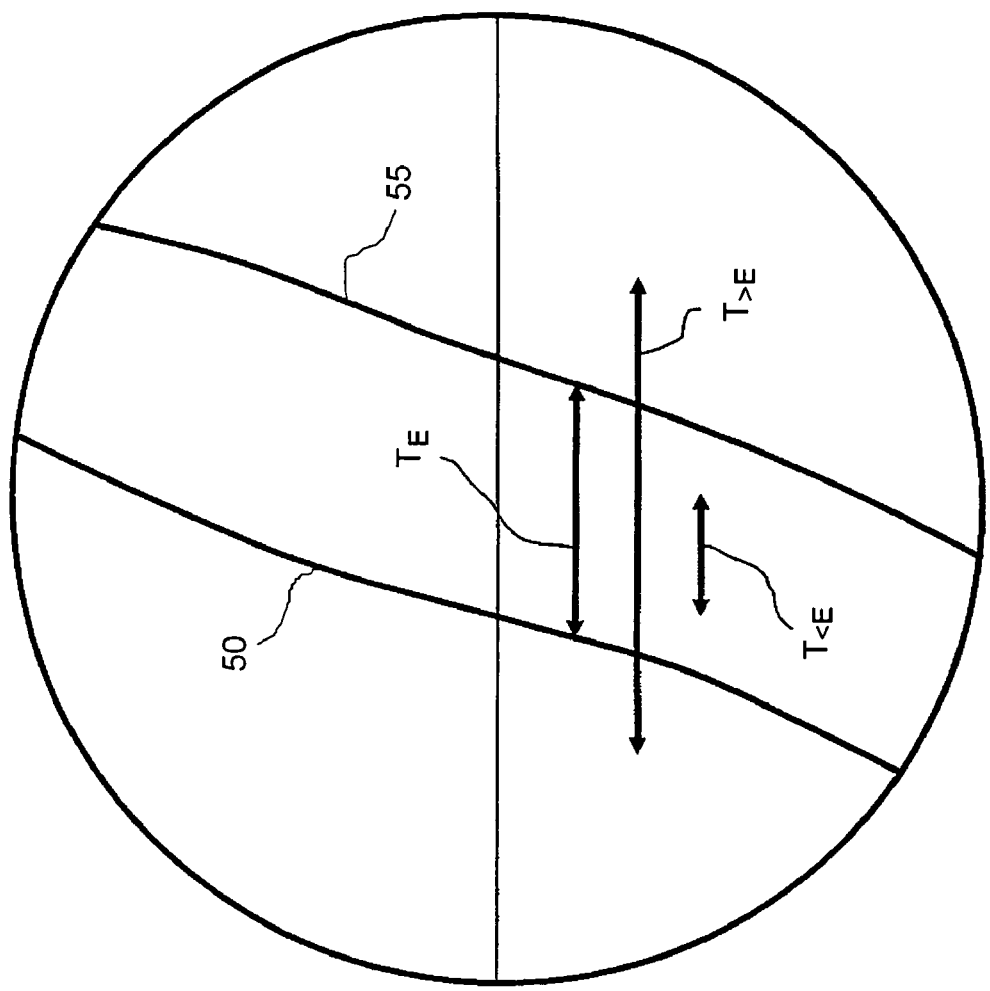

METHOD OF DISTINGUISHING, FROM A MOVING PLATFORM, STATIONARY OBJECTS FROM MOVING OBJECTS

CROSS REFERENCE TO RELATED APPLICATION

This application claims priority to U.S. Provisional Patent Application No. 60/696,971, filed Jul. 6, 2005, and is incorporated by reference herein for all purposes.

FIELD OF THE INVENTION

This invention relates generally to the field of sensing or detecting objects, and more particularly to detecting objects from a moving platform, such as a vehicle. Most particularly this invention relates to a method of distinguishing moving objects from stationary objects for the purpose of, for example, blind spot detection.

BACKGROUND OF THE INVENTION

Much effort has recently been directed to developing safety systems which assist vehicle drivers by detecting objects located in the so-called blind spot of the driver's vision or field of view. The blind spot exists due to the limited scope of view provided by conventional systems of rear and side view mirrors. The existence of the blind spot is well known and requires a practice known as the shoulder check prior to, for example, changing lanes. In a shoulder check, the driver must physically turn around and momentarily look backward to see if the way is clear for the vehicle to move sideways to change lanes. Often this is done under pressure and is subject to frequent misjudgments and often enough a shoulder check fails to reveal a vehicle in the blind spot. The problem is compounded in heavy traffic where numerous shoulder checks may be required before being able to find an opening to change lanes. In heavy traffic the likelihood of a sudden speed change of the traffic ahead is also increased so having the driver's attention diverted from the front to make shoulder checks is dangerous. What is needed is a device to supplement shoulder-checks to give a greater certainty that the blind spot is not occupied.

My own prior patents have described inventions to assist drivers in determining whether an object, such as another vehicle, is present in the blind spot by means of remote sensing technology. In particular in U.S. Pat. No. 6,753,766 there is disclosed a detecting device and method of using the same for this very purpose. This prior patent teaches using at least a first detector mounted to the moving host vehicle and aligned to a stationary target area for generating at least a first output representative of the stationary target area at a time T1 and at least a second detector mounted to the host vehicle and aligned to the stationary target area for generating a second output representative of the stationary target area at least at a second time T2. A control system receives said first and second outputs and compares the first output to the second output to identify differences between the outputs. If there are enough differences between the signals, i.e. above a noise threshold, then this means that something is moving in the stationary target area and an alarm is given. If the two signals are the same, or within a noise threshold, that means there has been no change to the stationary target area between time T1 And T2 and so the small difference between the signals represents a stationary target. In this manner a target vehicle moving through the stationary target area may be detected by a significant difference between the signals and the driver alerted before the driver has to make a shoulder check.

This prior invention is most reliable at avoiding false alarms when the fields of view of the two detectors are identical, for example, where the lines of sight of the detectors are parallel. However, parallel lines of sight are not always possible or desirable. Small changes in the mounting can result in misalignments and non-parallel sight lines. The host vehicle itself may exhibit roll, pitch, or other movement during the time between when the readings are taken by the first detector and the second detector, resulting in the two detectors not detecting exactly the same field of view of the target area. The stationary target area may include an abrupt field change, from near to far, such as an end of a guardrail, which can exacerbate differences from non-parallel fields of view, and which can lead to a false alarm. What is desired is an improved method that helps to reduce these false alarm issues for detector systems having two or more detectors.

SUMMARY OF THE INVENTION

The present invention is directed to an inexpensive yet elegant solution for reducing false alarms arising from stationary objects in a target area of a system with two or more sensors. The present invention reduces such false alarms, even where the detectors are not strictly seeing the same perspective of the target area or the vehicle has exhibited some roll, pitch, or other movement during the sensing period that has caused the detectors to see the target area from different angles.

According to the present invention there is provided a method of distinguishing, from a moving platform, stationary objects from moving objects, the method comprising:

using a first detector mounted to said moving platform to obtain at least a first output representative to a target area;

advancing the moving platform relative to the target area;

using a second detector mounted to said moving platform to obtain at least a second output representative of said target area; and making at least two comparisons of said first and second outputs for said target area at, at least two different time intervals, to distinguish, at a given time, stationary objects from moving objects in said target area.

In a further aspect, the present invention provides a means to determine an expected time delay between when the second detector sees the same target area as the first detector (which is a function of the distance between the target areas of the at least two detectors and the speed of the moving platform) wherein one of the two different time intervals is less than the expected time delay and the other of the two different time intervals is longer than the expected time delay. In a further aspect the readings may also be compared at a third time delay, which is substantially the same as the expected time delay.

BRIEF DESCRIPTION OF THE DRAWINGS

Reference will now be made, by way of example only, to preferred embodiments of the invention having regard to the following figures in which:

FIG. 2a is a close up of a portion of the plot of FIG. 2;

DETAILED DESCRIPTION OF THE PREFERRED EMBODIMENTS

In this description of the invention, the following terms shall have the following meanings:

The term moving platform shall mean any type of vehicle or other mobile device which moves, whether through the use of wheels or otherwise. The most common type of moving platform is considered to be motor vehicles such as cars, trucks, busses and the like, but the present invention can also be applied to many other types of moving devices or machines. The term moving platform is intended to comprehend all such devices.

The term detector means any type of device that can detect a feature or quality of a sensed or target area. The term detector includes active detectors, which send out a signal whose reflection is measured, as well as passive detectors which merely sense an amount of a given property or thing, for example, infrared or IR detectors. The most preferred form of detector is a passive infrared detector, for various reasons such as cost of sensor, ease of use and reliability, and weather penetrating capabilities, but other types of sensors are also comprehended as long as they provide an output which measures a quality in respect of the target area, which quality changes as an object passes through the target area. The terms detector and sensor are used interchangeably in this specification.

Figure 1:
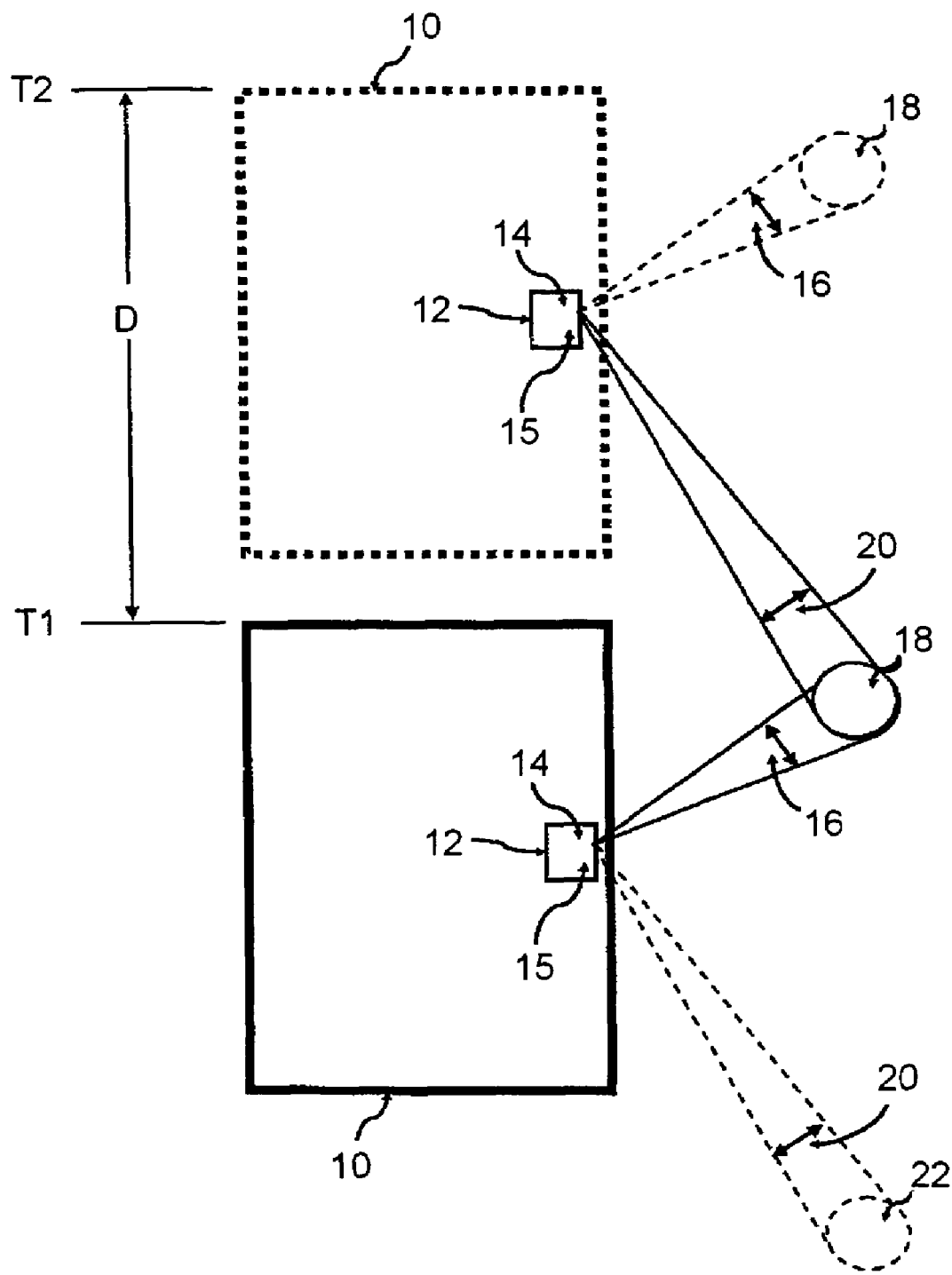
FIG. 1 is a view of a host vehicle having a number of detectors mounted thereon according to one aspect of the present invention.

In FIG. 1, a drawing of a moving platform is provided, which in this case is a vehicle 10 having a detector system 12 mounted thereon. The vehicle 10 is shown in solid outline at time T1 and in dotted outline at time T2. Between T1 and T2 the vehicle 10 has moved forward a distance D. The detector system 12 includes on at least one side of the vehicle a first sensor 14 and a second sensor 15. Although shown on one side of the vehicle in FIG. 1, the detector system 12 is most preferable mounted on both sides of the vehicle and there may be multiple mountings on one or both sides depending upon how long the vehicle is.

The first detector 14 defines a field of view 16 and a target area 18. The second detector 15 defines a second field of view 20, and a second target area 22, both shown in dotted outline. When the vehicle 10 advances or moves forward a distance D, the second target area 22 generally overlaps with what was previously (before the moving platform moved) the first target area 18 at time T1. At time T2 the field of view 16 and the target area 18 are shown in dotted outline. The present invention contemplates comparing the output from the first detector 14 of the target area 18 with the output of the second detector 15, generally at about the time that the target area 22 maps onto what was at Ti the target area 18. This is illustrated by the solid lines of the field of view 20 at time T2.

The first detector therefore can detect a quality of the target area at a time T1. In this sense the sensor obtains a reading from the target area, which is representative of the target area at that instant in time. Then the vehicle moves forward and the second detector can detect the same quality of the target area at a time T2, when the second target area substantially overlaps the first target area. The outputs from the detectors can be compared, for the specific target area, to determine whether any changes have taken place in the target area between T1 and T2. A change denotes the present of a moving object, since a stationary object should be detected the same way by each of the first and second detectors. A predetermined threshold is used to eliminate differences, which may arise due to noise or other signal anomalies.

The outputs from the first and second detectors cannot be compared at the same instant in time, since at the same instant in time the detectors are obtaining readings from different target areas 18 and 22. The signals can be directly compared, where the signals have been obtained from the same target area. Thus, the present invention relies on a time delay for signal comparison, which is based on the spacing between the target areas and the speed of the moving platform. The expected time delay thus means the time between T1 and T2, namely the time that it takes for the second sensor to map onto or read the same target area as the first sensor was reading or sensing at time T1 or the time it takes the vehicle 10 to travel the distance D. Because the speed of the moving platform may change a great deal during a typical trip, it is most preferred for motorized vehicles such as cars, trucks and busses to measure the speed and to continually calibrate the expected time delay according to the vehicle speed. Thus an aspect of the present invention is to have a means to determine the expected time delay at any given point in time, which in the preferred embodiment includes a means to measure the speed of the moving platform. Then, based on the distance between the target area 18 of the first sensor from the target area 20 of the second sensor, a means to compute or calculate the expected time delay is used. The speed measurement may be obtained in a number of ways, including using the onboard speedometer, if there is one, or, using a remote measuring system like GPS or the like. Further, rather than relying on the indirect calculation of the time delay as noted above, the time delay can be estimated from the time delay between the signals obtained from the sensors, as explained in more detail below. In this latter case, it is not necessary to rely on the speedometer. All that is required is to be able to determine the appropriate time delay between when the first sensor or detector senses the object in the target area and when the second sensor senses the same object in the target area. Thus, the present invention comprehends a number of different means for determining the expected time delay between when the first detector obtains an output representative of the target area and the second detector obtains an output representative of the target area.

The present invention requires certain hardware and software or firmware to provide a control system to be able to carry out the signal processing. As will be appreciated by those skilled in the art, many forms of computational devices are possible, provided that the control system can receive the speed and sensor data, make the preferred comparisons as outlined below, and generate an output signal to the driver to alert the driver to the presence of an object in the blind spot. Most preferably the control system will be in the form of an onboard computational device, but other forms of devices are also comprehended by the present invention. Further, the computations referred to herein can be performed by software, of a combination of software and hardware or even hardware alone. All forms of computational devices, which are capable of performing the required method are comprehended by the present invention.

As described above, in certain circumstances, the first detector and the second detector can have different readings for stationary objects, even when the signals are compared at the expected time delay. There are various reasons for the differences, such as nonparallel alignment of the fields of view, pitch or roll of the vehicle, bouncing of the vehicle so one reading is taken at a lower angle at T1 and the second reading at T2 is at a higher angle. Also, some surfaces may produce different signals depending upon what angle the target area is viewed from. For example, a textured surface may reflect more radiation from one direction than from another. In my prior patent I teach that the use of a threshold to contain the noise, which might otherwise lead to signal divergence between the outputs of the first and second detectors can avoid many false alarms. However, some false alarms do still arise and the problem becomes worse as line the lines of sight become less parallel.

According to the present invention, further signal processing can be used to reduce the incidence of false alarms arising from stationary objects. As long as the sensors are looking at a flat horizontal surface, such as the road, then even with different fields of view to the same target area, the time delay between to outputs is constant. However, as soon as the sensors are sensing an object which is not in the horizontal plane, then the object will be either closer or further away than expected and the time delay between the two signals will need to be shorter or longer to make a true comparison. The present invention addresses the problems associated with stationary objects not in the horizontal plane of the roadway (such as ditches, fences or guard rails). Thus, it can now be appreciated why the term expected time delay is used in this description, in that it is the time delay expected assuming the object being sensed is located in the centre of the field of view of the target area. The true time delay can be either slightly longer or shorter than the expected time delay depending upon the lateral distance to the sensed object.

Figure 2:
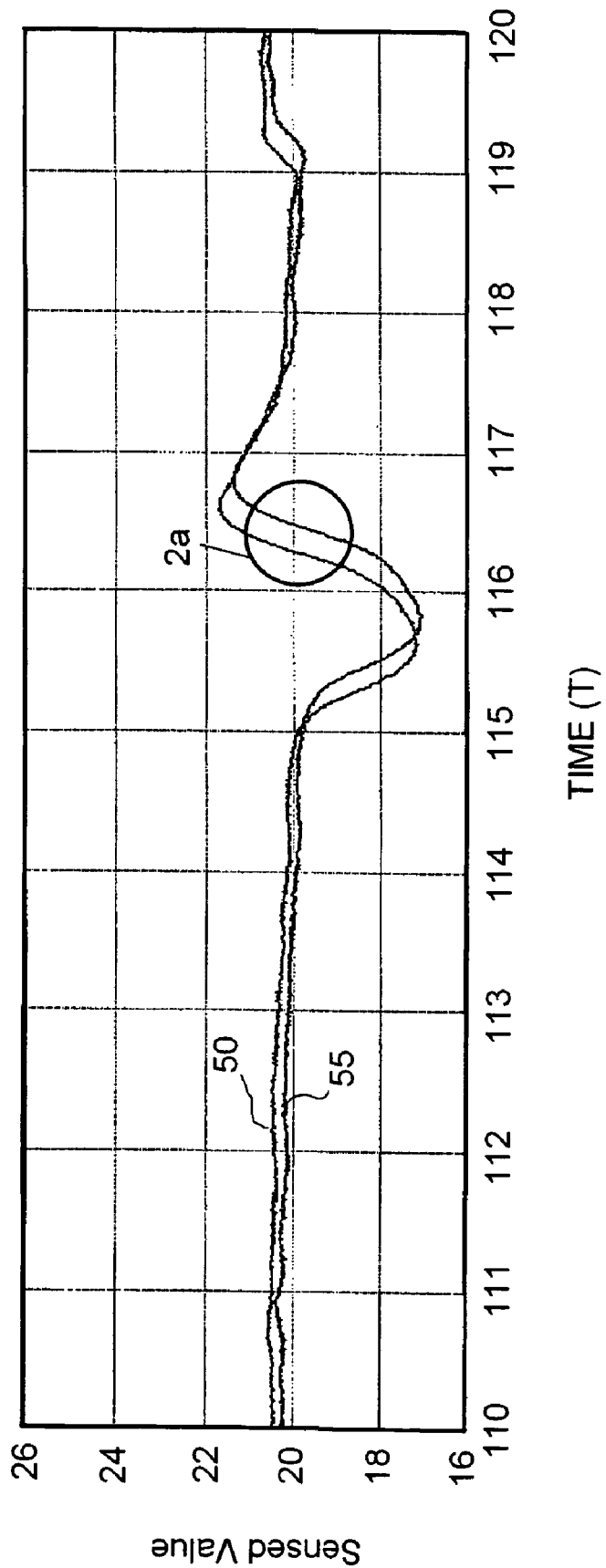
FIG. 2 is a typical output plot of time vs. detected value from a front and rear sensor passing a cold stationary object.

FIG. 2 shows a typical signal or sensing output from the first and second detectors as they pass a stationary cold object (like a bridge underpass). In FIG. 2, the horizontal axis is time and the vertical axis is sensed value, for example, of thermal radiation. This is a schematic and the absolute value of the plots is not critical, rather it is the relative values that are important as explained below. The outputs are plotted over time as plot 50 for the first sensor and plot 55 for the second sensor, and represent thermal values representative of the target areas sensed by the sensors. The expected time delay is depicted graphically as the separation, along the horizontal time axis, between the trace 50 from the trace 55. This is shown as $T_E$ in FIG. 2a. As noted earlier, comparing the traces 50 and 55 is another way to determine the expected time delay, without measuring the speed of the vehicle.

Figure 3:
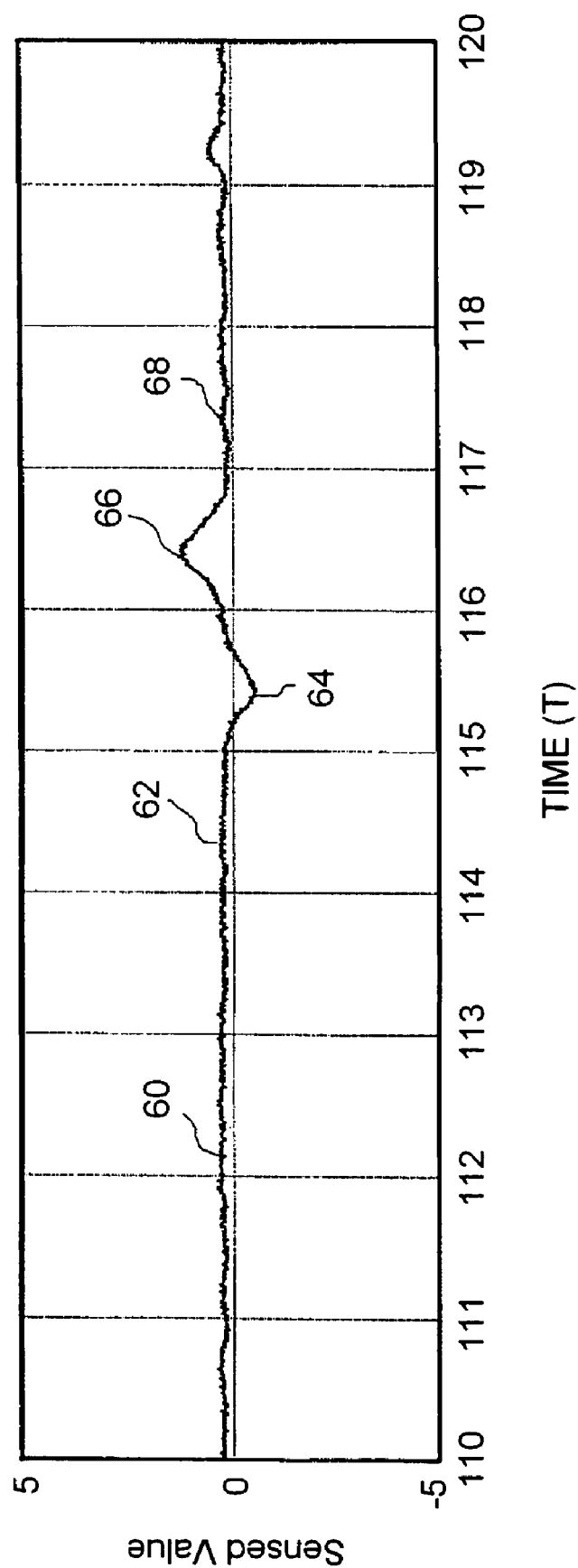
FIG. 3 is a subtraction of the first signal output of FIG. 2 from the second signal output of FIG. 2 at a first time delay.

In FIG. 3, the signals have been subtracted from one another, but at a time delay which is too short as compared to the expected time delay based on the speed of the vehicle. In this case the time delay would be graphically represented as a line shorter than $T_E$ such as shown as $T_{<E}$ in FIG. 2a. The plot 60 of FIG. 3 describes a relatively horizontal line 62 followed by a slight negative dip at 64 followed by a sight positive rise at 66, followed by a further flat part at 68. The dip 64 and the rise 66 occur as the object is passed by the moving platform.

Figure 4:
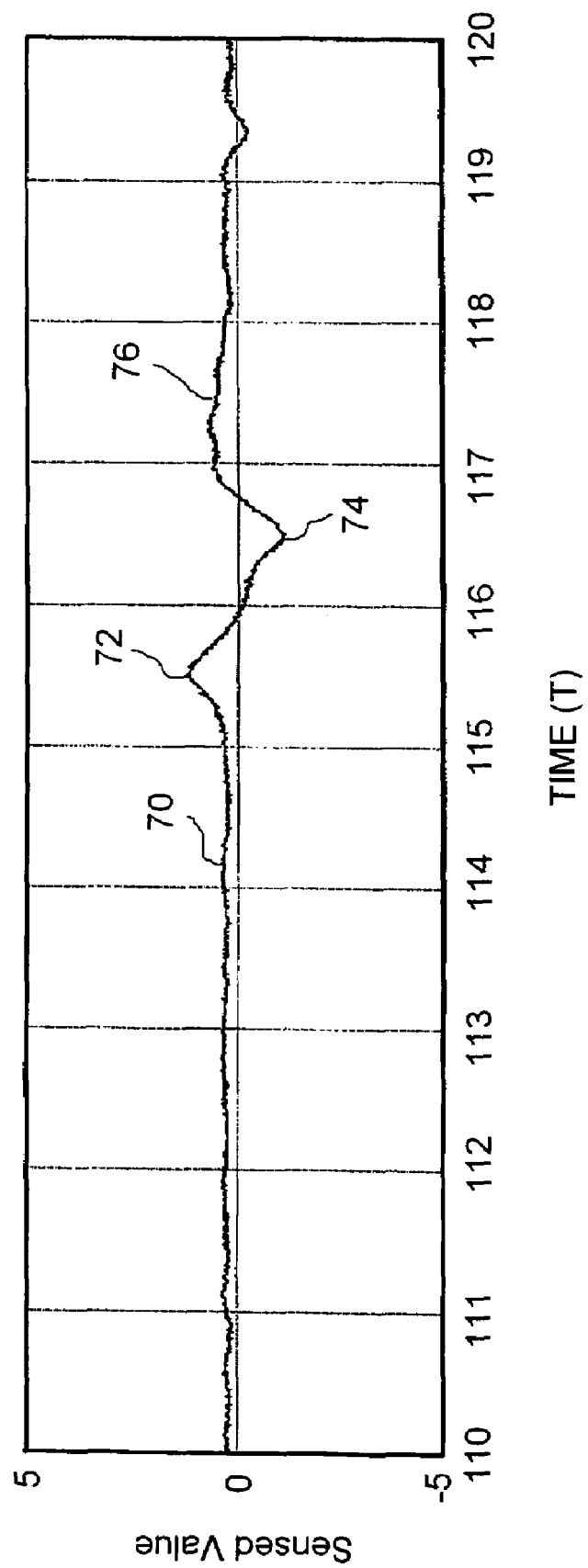
FIG. 4 is a subtraction of the first signal output of FIG. 2 from the second signal output of FIG. 2 at a second time delay.

In FIG. 4 the signals have been subtracted, based on a time delay which is too long as compared to the expected time delay, and this is depicted graphically in FIG. 2a as $T_{>E}$. In FIG. 4 there is a flat part 70 followed by a slight rise at 72 followed by a slight dip at 74 followed by a flat part at 76. Again, the rise 72 followed by the dip 74 represents the moving platform passing past the stationary object. Note that the rise at 72 corresponds to the dip at 64 and the dip at 74 corresponds to the rise at 66. In this context, corresponds means they are located generally at the same point in the time plot.

It can now be appreciated that the shape of the line representing the comparison between the signal values from the first detector and the second detector is inverted between the longer than expected time delay (FIG. 4) and the shorter than expected time delay (FIG. 3).

Figure 5:
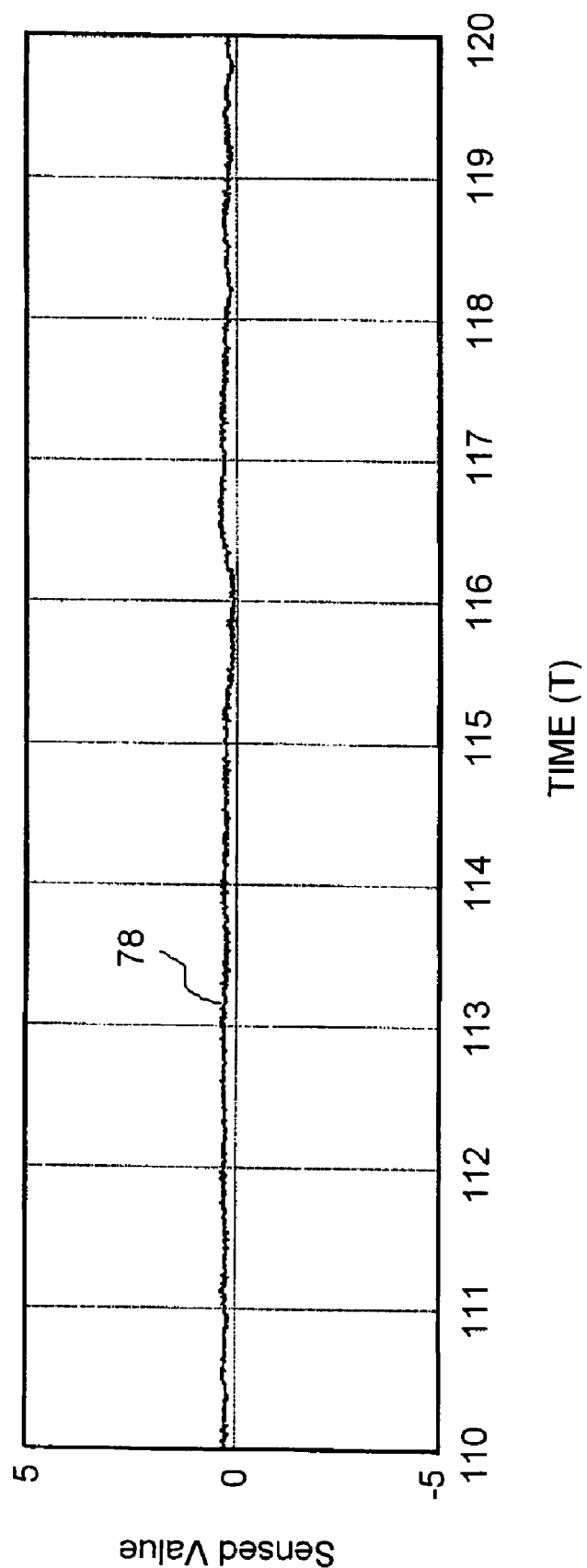
FIG. 5 is a subtraction of the first signal output of FIG. 2 from the second signal output of FIG. 2 at a third time delay.

For comparison, in FIG. 5 the output signals have been subtracted by the expected time delay, which results in a close to horizontal or flat line 78 because the signals almost exactly cancel one another. In this case the differences between the signals would not exceed a threshold, shown as t in the figures. As can now be appreciated, although the threshold value t is the same of each of FIGS. 3, 4, and 5, the threshold value is exceeded in both FIGS. 3 and 4, although not in FIG. 5. This demonstrates how a false alarm can be generated for a stationary object, in the prior art, if the expected value is not the true time delay between the readings at times T1 and T2. The present invention can assist to overcome the problems associated with such false alarms by distinguishing between stationary and moving objects as explained in more detail below.

Figure 6:
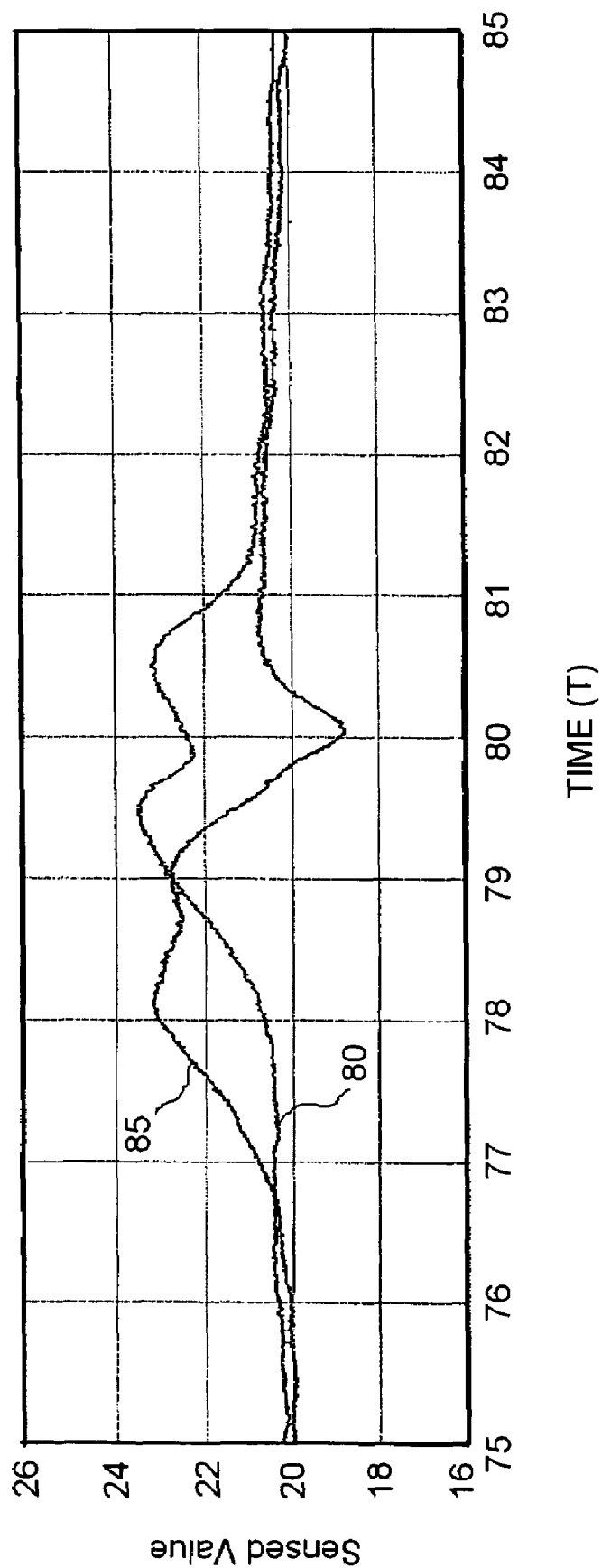
FIG. 6 is a typical output plot of time vs. detected value from a front and rear sensor where a moving object is in the target area.
Figure 7:
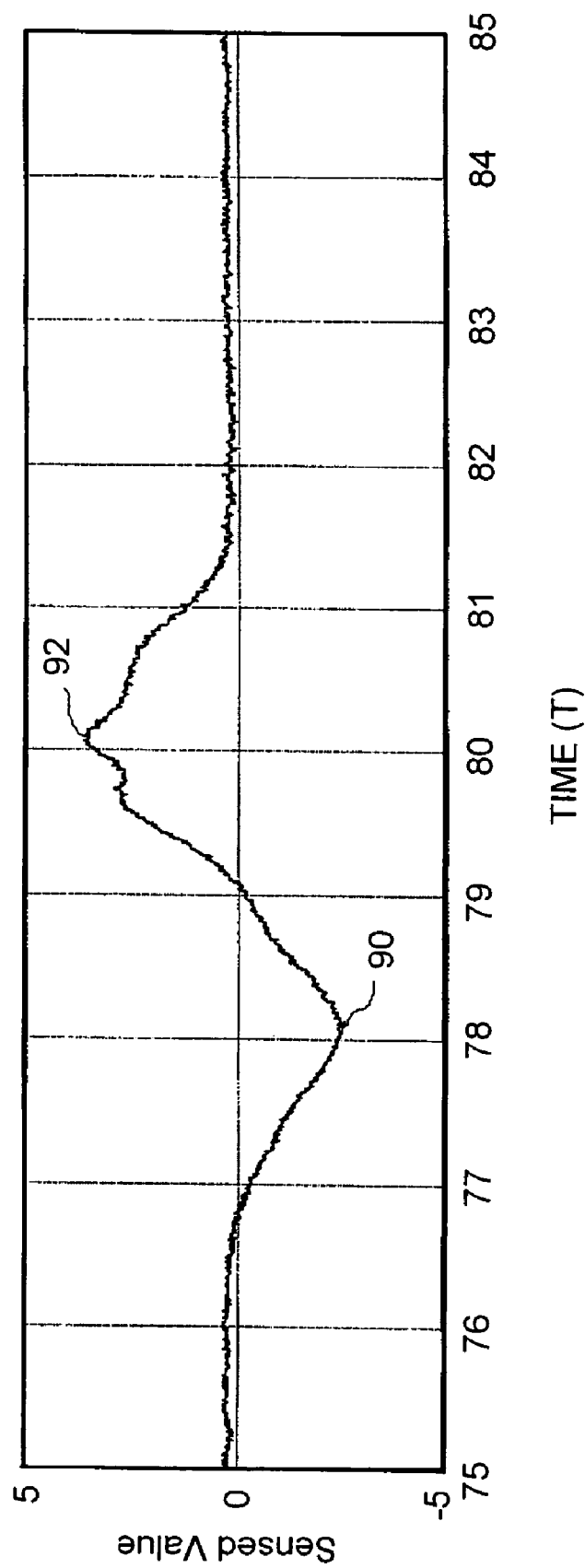
FIG. 7 is a subtraction of the first signal output of FIG. 6 from the second signal output of FIG. 6 at a first time delay.
Figure 8:
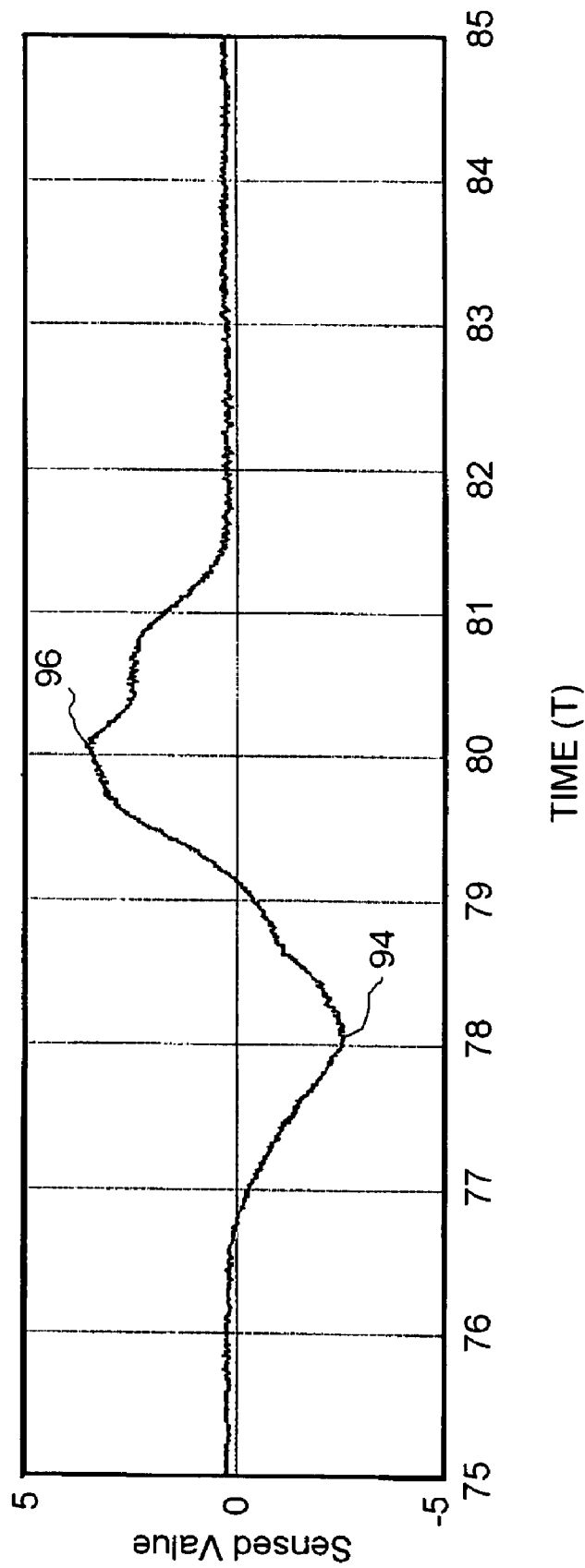
FIG. 8 is a subtraction of the first signal output of FIG. 6 from the second signal output of FIG. 6 at a second time delay and FIG. 9 is a subtraction of the first signal output of FIG. 6 from the second signal output of FIG. 6 at a third time delay.
Figure 9:
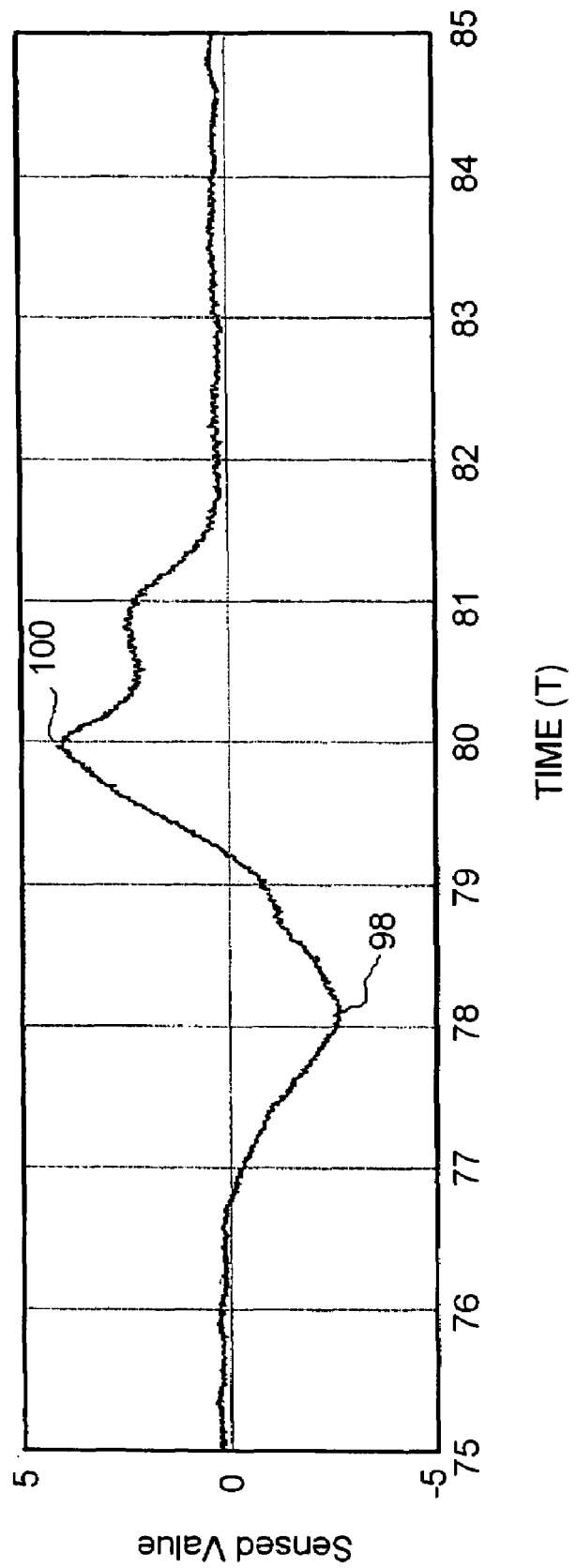

FIG. 6 shows typical signals for a moving target from the front and rear or from the first and second detectors, shown as plots 80 and 85. In FIG. 7 the signals have been subtracted with a time delay which is shorter than the expected time delay. This results in a trace which has a dip 90 followed by a peak at 92. In FIG. 8 the signals have been subtracted with a time delay which is substantially the same as the expected time delay. This shows a dip at 94 and a peak at 96. In FIG. 9 the signals have been subtracted with a time delay, which is longer than the expected time delay. FIG. 9 shows a dip at 98 and a peak at 100.

As will now be appreciated, all of the three traces from FIGS. 7, 8, and 9 look substantially the same, having dips and peaks, which correspond generally to the same point in time on the time axis. As well, all three traces in FIGS. 7, 8, and 9 show peaks, which are above the threshold t. A moving target creates a larger difference in the signals over a longer period of time. Thus, even varying the time delay about an expected time delay as a basis for the signal subtraction or comparison results in a similar trace profile for all three sample time delays chosen, unlike the case for a stationary object, where the trace inverts between the too short ($T_{>E}$) and the too long ($T_{>E}$) time delays.

According to the present invention, the use of a shorter and longer time delay than the expected time delay can be used to detect the presence of moving objects by eliminating signal anomalies that are attributable to stationary objects, even where the signal anomalies appear to exceed the threshold in certain circumstances. Provided that the time delays used in the subtraction calculation are on either side of the expected time delay, then one of the traces should become inverted for a stationary object. Thus, the present invention comprehends a method whereby stationary objects can be distinguished from moving objects by determining if the trace undergoes a sign change or becomes inverted, even if the absolute value of the signal difference is above the threshold when compared at the expected time delay. The presence of an inverted trace (by the sign change alone) can be used to determine that a stationary object has been passed, rather than a moving object. Of course, it will be understood by those skilled in the art that the full plot is not necessary and that the comparison can be made on a data point by data point comparison basis. The full plots are provided herein for ease of understanding, but the invention comprehends all manner of actual comparison to determine sign changes or inverted traces.

The present invention comprehends that any number of time delays could be used and at any amount of a variance from the expected time delay. However, practical limits on signal processing power may restrict such comparisons to only a few such comparisons. The smallest number is to use two different time delays for the same set of readings, one on either side of the expected time delay. To ensure that the expected time delay is so bracketed, it is preferred to use a time delay of about one half of the expected time delay as the shorter delay and about twice the time delay of the expected time delay for the longer time delay, but many variations in time delay are comprehended by the present invention. One way to determine the shorter and longer time delays would be to determine the lateral distance out from the host vehicle or moving platform between the closest object sensed and the furthest object sensed in the target area field of view. Then the difference in time delay arising from such a change in horizontal distance in the field of view can be determined and the shorter and longer time delays chosen to be outside of such a range of expected time delays.

Thus, according the present invention, a signal-processing step can be used to eliminate false alarms arising from stationary objects that are not in the horizontal plane and which would otherwise create an alarm condition without this signal processing. The signal processing includes subtracting the signals from the first and second sensors at a too short time delay and at a too long time delay relative to the expected time delay and determining if any of the values change sign, or invert between the two time delay values. If so, then a stationary object has been passed and no alarm should be issued. On the other hand, if the traces are all of the same sign and do not invert and they are above the threshold, then an alarm should be declared. Thus, the present invention contemplates at least two, and even more comparisons of the data generated by the first and second sensors, which are representative of the target area rather than the one comparison of the prior art. By such further comparisons, anomalous effects caused by changes in the horizontal distance from the sensed objects can be compensated for, thereby allowing for laterally displaced stationary objects to be distinguished from moving objects. This will reduce false alarms arising from rolling, pitching, bouncing or non-parallel sight lines for the sensors.

It will be appreciated by those skilled in the art that the foregoing is a brief explanation of the present invention and that many variations are possible which are still within the broad scope of the appended claims. Some of these variations have been explained above and others will be apparent to those skilled in the art. For example, while passive infrared sensors have been described as a preferred form of detector, many other forms of detectors might also be used. However, infrared is preferred for its weather-penetrating capabilities. Also, while the present invention is directed to a detector for sensing objects in the blind spot, once the system determines that there is no object there, a single and final shoulder check is still recommended by the driver prior to changing lanes.

I claim:

1. A method of distinguishing, from a moving platform, stationary objects from moving objects, the method comprising:

using a first detector mounted to said moving platform to obtain at least a first output representative of a target area;

advancing the moving platform relative to the target area;

using a second detector mounted to said moving platform to obtain at least a second output representative of said target area;

determining an expected time delay between when said at least first output representative of said target area is obtained and when said at least second output representative of said target area is obtained; and making at least two comparisons of said first and second outputs for said target area at least two different time intervals, to distinguish, in said target area, stationary objects from moving objects.

2. A method of distinguishing, from a moving platform, stationary objects from moving objects, as claimed in claim 1, wherein said step of determining said expected time delay further includes determining a speed of said moving platform.

3. A method of distinguishing, from a moving platform, stationary objects from moving objects, as claimed in claim 1, wherein said step of making at least two comparisons further includes comparing said first and second outputs at a first time delay which is shorter than said expected time delay and said same outputs at a second time delay which is longer than said expected time delay.

4. A method of distinguishing, from a moving platform, stationary objects from moving objects, as claimed in claim 3, further including the step of determining if said comparisons produce a difference between said first and second outputs which is above a predetermined threshold.

5. A method of distinguishing, from a moving platform, stationary objects from moving objects, as claimed in claim 4, further comprising comparing said difference between said first and second outputs at said time which is shorter than said expected time delay with said difference between said first and second outputs at said time which is longer than said expected time delay, and declaring a moving object if each of said differences have the same sign.

6. A method of distinguishing, from a moving platform, stationary objects from moving objects, as claimed in claim 4, further comprising comparing said difference at said time which is shorter than said expected time delay with said difference at said time which is longer than said expected time delay, and declaring a stationary object if each of said differences has a different sign.

7. A method of distinguishing, from a moving platform, stationary objects from moving objects, the method comprising:

using a first detector mounted to said moving platform to obtain at least a first output representative of a target area;

using a second detector mounted to said moving platform to obtain at least a second output representative of said target area after an elapsed time of TE; and determining an expected time delay between when said at least first output representative of said target area is obtained and when said at least second output representative of said target area is obtained;

making at least two comparisons of said first and second outputs, one comparison at $T_{<E}$ and the other comparison at $T_{>E}$ to distinguish moving objects from stationary objects in said target area.

* * * * *